United States Patent
Warrier et al.

(10) Patent No.: US 7,992,151 B2
(45) Date of Patent: Aug. 2, 2011

(54) METHODS AND APPARATUSES FOR CORE ALLOCATIONS

(75) Inventors: Ulhas Warrier, Beaverton, OR (US); Omesh Tickoo, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 1275 days.

(21) Appl. No.: 11/606,858

(22) Filed: Nov. 30, 2006

(65) Prior Publication Data

US 2008/0134191 A1 Jun. 5, 2008

(51) Int. Cl.
*G06F 9/46* (2006.01)
*G06F 1/00* (2006.01)
*G06K 1/08* (2006.01)

(52) U.S. Cl. ........ 718/104; 713/323; 713/324; 713/340; 702/132

(58) Field of Classification Search .................... 718/104
See application file for complete search history.

(56) References Cited

U.S. PATENT DOCUMENTS

| | | | | |
|---|---|---|---|---|
| 5,502,838 A * | 3/1996 | Kikinis | .......................... | 713/501 |
| 6,823,240 B2 * | 11/2004 | Cooper | .......................... | 700/299 |
| 7,318,164 B2 * | 1/2008 | Rawson, III | .................. | 713/320 |
| 7,802,073 B1 * | 9/2010 | Cheng et al. | .................... | 712/10 |
| 2003/0009648 A1 * | 1/2003 | Doing et al. | .................. | 711/202 |
| 2003/0110012 A1 * | 6/2003 | Orenstien et al. | ............. | 702/188 |
| 2004/0215987 A1 * | 10/2004 | Farkas et al. | ................ | 713/300 |
| 2006/0101464 A1 * | 5/2006 | Dohrmann | .................... | 718/100 |
| 2006/0184287 A1 * | 8/2006 | Belady et al. | ................. | 700/291 |
| 2007/0198863 A1 * | 8/2007 | Bose et al. | .................... | 713/300 |

* cited by examiner

*Primary Examiner* — Jennifer N. To
(74) *Attorney, Agent, or Firm* — Schubert Law Group, PLLC

(57) ABSTRACT

Apparatuses, systems, and methods to monitor core performance and integrated circuit chip temperatures in order to alternatively partition cores and core resources are disclosed. Embodiments generally comprise integrated circuit processors in chips that contain multiple cores or processing elements. In many system and apparatus embodiments, a module monitors either the throughput or performance of one or more of the cores. In such embodiments, another module, a core allocation module, partitions or allocates cores in different arrangements of partitions to improve performance. Additionally, in some embodiments, a temperature monitoring module monitors one or more temperatures of the chip containing the cores, wherein the temperature measurements may affect the core allocations. In some embodiments, once an allocation for the cores is selected, the specifics of the cores to be placed in different partitions may be stored and later retrieved when triggered by events allowing for the reallocation of the cores.

26 Claims, 5 Drawing Sheets

METHODS AND APPARATUSES FOR CORE ALLOCATIONS

FIELD

The present invention is in the field of computing apparatuses. More particularly, the present invention relates to apparatuses, systems, methods, and media to allocate cores or core resources to partitions of computing apparatuses.

BACKGROUND

Computer system designers have traditionally increased performance of computing apparatuses by increasing their operating frequencies and by increasing the number of components, such as transistors, in circuits of such apparatuses. To keep circuit sizes manageable designers have reduced or scaled down the size of the circuit components so that increasing numbers of devices fit within smaller per unit areas. Today it is not uncommon to find advanced computer system chips containing millions, sometimes billions, of transistors. This increased density, however, has created numerous problems. One major problem is heat. While individual electronic components, such as transistors, each generate minute quantities of heat while operating, increased numbers of such devices in the newer circuits naturally lead to increased quantities of heat.

To combat problems related to heat and other design challenges, yet still to keep increasing the performance and throughput, designers of computer processors and computing apparatuses are turning to alternative design technologies. Today many designers are developing computing apparatuses having numerous computational circuits, or cores, housed in single chips or packages. Processors having numerous cores often divide computational tasks among the different cores, with the cores being allocated to different partitions or execution domains. Doing so often improves performance and offers other benefits, such as reduced operating frequencies, reduced power consumption, and reduced heat generation. Even with these benefits, however, processors with numerous cores are creating new design challenges.

Currently, no specific mechanisms exist to determine the core allocations for different partitions based upon such factors as performance or temperature. Each partition is arbitrarily assigned a specific number and topology of cores. In other words, cores assigned to a partition may be located within the processor complex in a particular configuration that will impact the performance of the cores and thermal profiles. Usually cores are assigned to partitions in a sequential manner with respect to the core identification numbers (IDs) within a socket. Since the core assignment does not take performance into consideration, there is a potential for resource underutilization at the socket level. Additionally, problems associated with power and heat distribution have not been totally eliminated. Depending on the workloads operating in the individual partitions, the power consumed and the heat generated is heavily dependent on the topological distribution of the participating processor components. Previous studies involving un-partitioned single core processors have shown that, depending on the workloads, thermal hotspots can form on the most "busy" areas of the processor die which may necessitate slowing down or completely shutting-off the processor, which results in performance degradation.

BRIEF DESCRIPTION OF THE DRAWINGS

Aspects of the invention will become apparent upon reading the following detailed description and upon reference to the accompanying drawings in which like references may indicate similar elements.

DETAILED DESCRIPTION OF EMBODIMENTS

Figure 1:
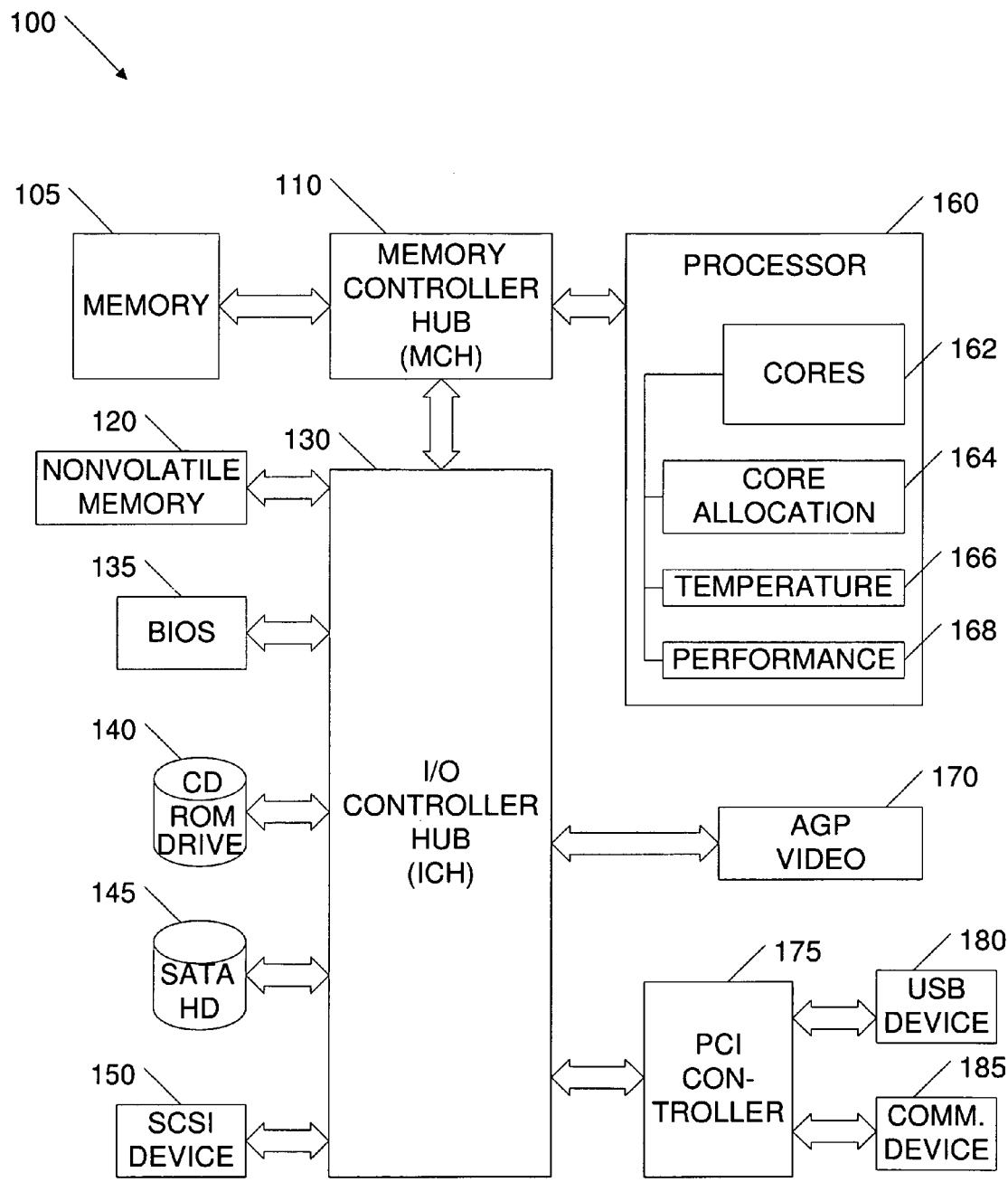
FIG. 1 depicts a system with a processor comprising multiple cores, a core allocation module, a temperature module, and a performance module.

The following is a detailed description of embodiments of the invention depicted in the accompanying drawings. The embodiments are in such detail as to clearly communicate the invention. However, the amount of detail offered is not intended to limit the anticipated variations of embodiments; but on the contrary, the intention is to cover all modifications, equivalents, and alternatives falling within the spirit and scope of the present invention as defined by the appended claims. The detailed descriptions below are designed to make such embodiments obvious to a person of ordinary skill in the art.

Generally speaking, apparatuses, systems, and methods to monitor core performance and chip temperatures in order to alternatively partition cores and core resources are contemplated. Embodiments generally comprise processors formed from integrated circuits in dies of chips that contain multiple cores, or processing elements. In many system and apparatus embodiments, a module monitors either the throughput and/or performance of one or more of the cores. Another module, a core allocation module, partitions or allocates cores in different arrangements of partitions to improve performance. Additionally, a temperature monitoring module may also monitor one or more temperatures of the chip containing the cores. Temperature measurements from the temperature monitoring module may affect how the core allocation module allocates the cores into the different partitions. In some embodiments, once an allocation for the cores is selected the specifics, such as the number and topology, of cores to be placed in different partitions may be stored while waiting for an opportunity to reallocate the cores. Once stored, the core allocation module may retrieve the core allocation information when triggered by events that allow for the reallocation of the cores.

The system embodiments described herein generally comprise multiple core processors arranged to work in conjunction with memory devices, controller hubs, display devices, and mass storage devices. Numerous system embodiments may perform throughput analyses in conjunction with chip temperature measurements to select an allocation for core partitions. In many of these system embodiments, this allocation may be stored to nonvolatile memory or to a mass storage device until a reallocation of cores to different partitions may be accomplished.

Method embodiments generally comprise pre-allocating cores to partitions before monitoring die temperatures and performances of cores in the dies. The embodiments also generally comprise analyzing the performances to determine allocations of cores that may improve performances or throughputs. Various method and system embodiments may include some analyses of the temperatures when determining the allocations of cores. Some method and system embodiments may store the information pertaining to the core allocations until an event occurs which allows core reallocation. The system embodiments may generally retrieve the core allocation information and allocate the cores to partitions accordingly.

While portions of the following detailed discussion describe embodiments to dynamically allocate cores to partitions in order to improve throughput of the cores in personal computers, persons of ordinary skill in the art will recognize that alternative embodiments may improve throughput of the cores in other types of computing apparatuses, such as servers. Additionally, while some portions of the discussion describe improving throughput of the cores in personal computers by reallocating the cores in partitions or execution domains, some embodiments may improve throughput by reallocating other types of hardware resources, such as cache memory. In other words, terms such as cores, core hardware, and hardware resources may sometimes be substituted or interchanged.

Many portions of the following detailed discussion describe allocating cores to partitions. The term partition may generally refer to a logical association of cores designated to work on a common task, such as the execution of a program. Generally, one partition may be designated to work on one task, such as executing a first operating system, while another partition may be designated to work on a second task, which may comprise executing a second operating system.

Different embodiments may employ different methods of partitioning. For example, some embodiments may perform firm partitioning, such that the logical association of cores to a partition is handled by hardware components. On the other hand, some embodiments may perform virtual partitioning, such that the logical association of cores to a partition is handled by software. Even further, some embodiments may perform partitioning using a combination of both hardware and software components.

Turning now to the drawings, FIG. 1 depicts a system 100 with a processor 160 comprising multiple cores 162. In some embodiments system 100 may comprise a computer system, such as a notebook, palmtop computer, or personal digital assistant (PDA). In other embodiments system 100 may comprise a different type of computing apparatus, such as a desktop computer. For example, in some embodiments system 100 may comprise a notebook or laptop computer used by a college student to create documents using such applications as word processors and/or spreadsheet programs. Additionally, the student may use the notebook computer to run a web browser, an e-mail program, and an internet chat application. In other embodiments, system 100 may comprise a desktop computer in a business setting. Similar to the laptop computer of the student, the desktop computer may run a word processing application, a spreadsheet program, a database program, and internet applications. Additionally, or in the alternative, the desktop computer may also be used to run dedicated or specialized business applications, such as computer aided design (CAD), computer aided manufacturing (CAM), or supervisory control and data acquisition (SCADA) applications. In even further embodiments, system 100 may comprise another type of computing apparatus, such as a server, running a variety of other types of applications, such as a web server or simple mail transport protocol (SMTP) application.

In some embodiments, processor 160 may comprise a relatively small number of cores 162, such as four, while in other embodiments processor 160 may comprise a relatively large number of cores 162, such as eight, thirty-two, or more. Processor 160 may be coupled to a memory controller hub (MCH) 110. Processor 160 may execute operating instructions for programs and applications run by users of system 100, such as instructions of the word processing or CAD applications noted above. Such software programs and related instructions may be stored in memory 105. Processor 160 may execute the instructions in memory 105 by interacting with MCH 110. The types of memory devices comprising memory 105 may vary in different embodiments. In some embodiments, memory 105 may comprise volatile memory elements, such as two 1-gigabyte (GB) dynamic random access memory (DRAM) sticks. In other embodiments, memory 105 may comprise nonvolatile memory. For example in some embodiments memory 105 may comprise a flash memory module, such as a 4 gigabyte (GB) flash memory card.

MCH 110 may also couple processor 160 with an input-output (I/O) controller hub (ICH) 130. ICH 130 may allow processor 160 to interact with external peripheral devices, such as keyboards, scanners, and data storage devices. Programs and applications being executed by processor 160, and ultimately one or more cores 162, may interact with such external peripheral devices. Performance of the cores in executing the applications may be improved upon reallocating the cores.

System 100 may boot, or initialize, during a power-up process using software algorithms, called firmware, stored within read only memory (ROM) on a motherboard of system 100. In many embodiments, this firmware may be referred to as a basic input/output system (BIOS) 135 program. Included in BIOS 135 may be a Power-On-Self-Test (POST) code, or program, which causes processor 160 to perform a number of predefined tests on system 100 hardware. Additionally, BIOS 135 may send instructions to processor 160 such that processor 160 creates an initial allocation of cores 162. In other words, processor 160 may execute instructions provided by BIOS 135 to create an initial partition of cores 162 upon a boot event.

Whenever boots are not initial power-up boots, BIOS 135 may alternatively instruct processor 160 to partition cores 162 according to core allocation information stored in nonvolatile memory 120. In other words, system 100 may have been used on several previous occasions by a user, such as the student or business person noted in the previous examples. Since system 100 may have been used previously, a specialized or customized partition allocation for cores 162 may have been stored in nonvolatile memory 120. In this case, BIOS 135 may instruct processor 160 to partition cores 162 according to the customized partition allocation instead of a default or arbitrary allocation. Nonvolatile memory 120 may comprise flash memory in some embodiments while comprising programmable read-only memory (PROM) or another type of memory in other embodiments.

Processor 160 of system 100 may present information to a user via a display device coupled to Advanced Graphics Port (AGP) video card 170. In some embodiments, the type of display device may be a cathode-ray tube (CRT) monitor, a liquid crystal display (LCD) screen, or a thin-film transistor flat panel monitor. As previously described, processor 160 may utilize one or more processor cores of cores 162 to perform spreadsheet calculations and display the results to the user via AGP video card 170. Alternatively, in different embodiments, processor 160 may utilize multiple processor cores in different partitions of cores 162 to stream multimedia information to a user of system 100 via AGP video card 170 and the attached display device. With different types of tasks being performed by different users, in different embodiments of system 100, along with the associated different video requirements, one may begin to appreciate that one allocation of core partitions may perform well in one embodiment but poorly in another.

In various embodiments, ICH 130 may allow processor 160 to store and retrieve data from a universal serial bus (USB) device 180 via a Peripheral Component Interconnect (PCI) controller 175. Processor 160 may store and retrieve data from USB device 180 as part of running an application. Alternatively, processor 160 may store and retrieve core allocation information for cores 162. For example, processor 160 may send and receive performance information from a performance module 168 and a temperature module 166 to USB device 180. Processor 160 may also store and retrieve data via PCI controller 175 and communication device 185. For example, communication device 185 may comprise a network card. Processor 160 may send and receive performance and temperature information, as well as partition allocation information, to another computer system connected to system 100 via a local area network (LAN) and/or the Internet. System 100 may also be coupled with other types of hardware not depicted in FIG. 1, such as a sound card, a scanner, a printer, and other types of hardware devices. Processor 160, utilizing cores 162, may interact with these types of devices in various alternative embodiments.

In addition to USB device 180 and communication device 185, ICH 130 in system 100 may also allow the cores in cores 162 to interact with Advanced Technology Attachment (ATA) devices, such as ATA hard drives, compact disc (CD) drives, and digital versatile disc (DVD) drives. For example, ICH 130 may need to operate with a CD read only memory (CD ROM) drive 140 via a parallel ATA bus. CD ROM drive 140 may vary in different embodiments of system 100, such as comprising a compact disc recordable (CD-R) drive, a CD rewritable (CD-RW) drive, a DVD drive, a hard disk drive, a tape drive, or other storage device.

System 100 may also have a Serial ATA (SATA) bus coupling a SATA drive, such as SATA hard drive 145, to ICH 130. SATA hard drive 145 may be used to store an operating system, device drivers, and application software for system 100. For example, in some embodiments SATA hard drive 145 may store a Linux® operating system. In other embodiments, SATA hard drive 145 may contain other operating systems, such as Unix®, Macintosh® OS X, Windows®, or some other operating system.

System 100 may also be configured to operate other types of hardware devices, such as Small Computer Systems Interface (SCSI) device 150. In running various applications, processor 160 may store and retrieve core allocation information for cores 162 using CD ROM drive 140, SATA hard drive 145, and/or SCSI device 150. For example, processor 160 may send and receive performance information from performance module 168 and temperature module 166 to SATA hard drive 145, as well as partition allocation information.

Even further, depending on the embodiment of system 100, CD ROM drive 140, SATA hard drive 145, and/or SCSI device 150 may contain the program or software to monitor the performance of applications running on cores 162, to determine a core allocation, or to monitor temperatures of processor 160. During a boot sequence, processor 160 may retrieve the software, which may comprise assembly language instructions, and load the software into core temperature module 166, performance module 168, and/or core allocation module 164. Additionally, some embodiments may have another module, such as a task allocation module, which handles or schedules tasks among the various partitions for processor 160. In alternative embodiments, such scheduling and/or allocation may occur as part of the operating system being executed by the processor.

While the embodiment of system 100 shown in FIG. 1 illustrates how processor 160 may operate in a relatively complex arrangement having many components, alternative embodiments may contain many more elements, peripheral devices, and memories, as well as far fewer elements. For example, system 100 may comprise a portable computing device wherein processor 160 is coupled directly to memory 105 and a local display device. In such a system, unnecessary system components such as ICH 130, MCH 110, and SATA hard drive 145 may be totally excluded from system 100. Additionally, in alternative embodiments, the core allocation, temperature and the performance modules do not necessarily have to be a part of the processor architecture. For example, the implementation may be a part of the processor microcode, the firmware, or any agent that manages partitions.

System 100 may comprise hardware only elements in some embodiments while comprising hardware and software elements in others. In the embodiments comprising only hardware elements, system 100 may comprise a network of logic gates formed from constituent components such as complimentary metal oxide semiconductor (CMOS) devices or transistor-transistor logic (TTL) devices. In the embodiments comprising both hardware and software elements, elements such as processor 160 may comprise CMOS or TTL devices. Additionally, these hardware devices may be arranged to execute software, firmware, or microcode program instructions residing in such devices as memory 105.

Figure 2:
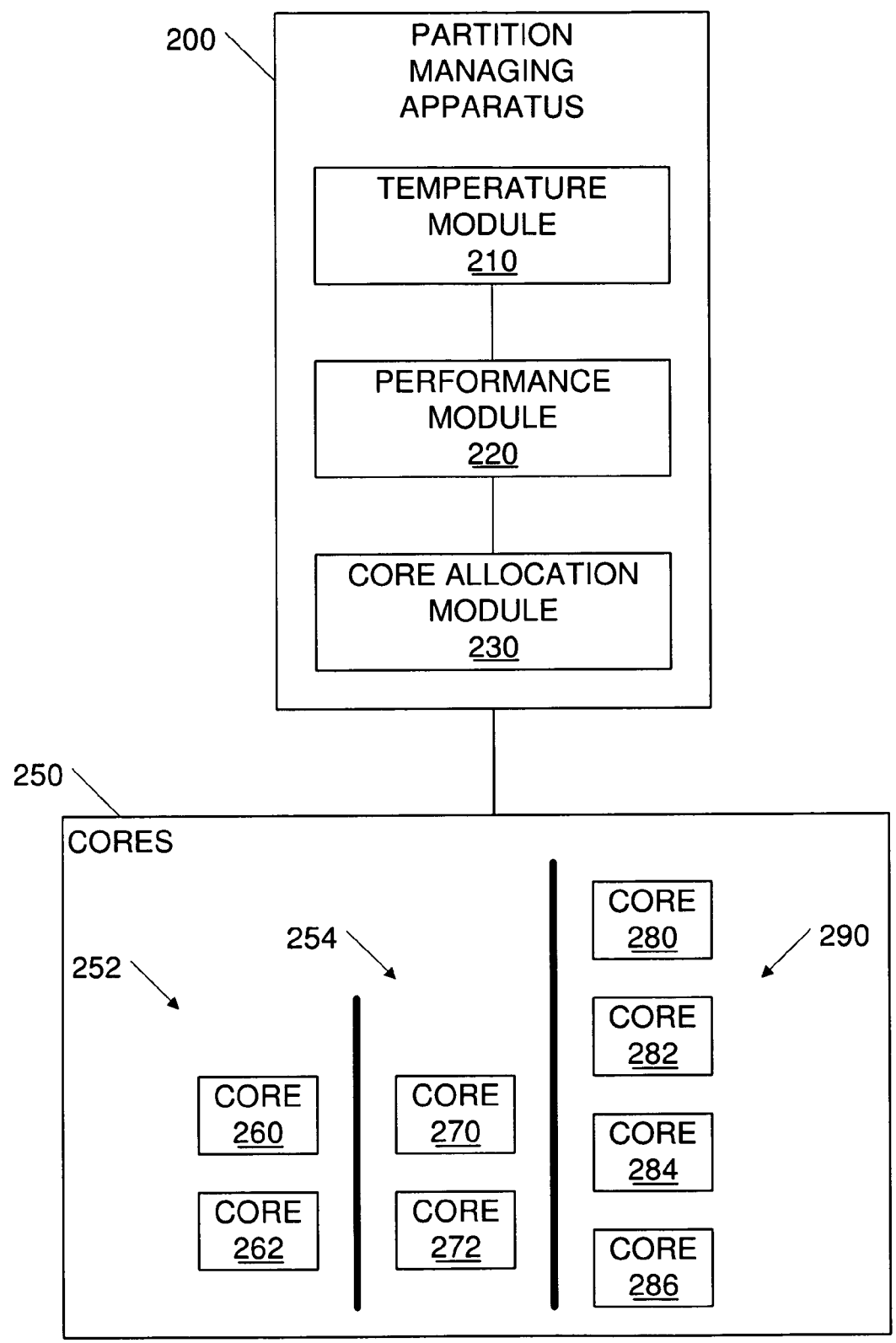
FIG. 2 depicts an embodiment of a partition managing apparatus.

Moving now to FIG. 2, we see an illustration of a partition managing apparatus 200. Partition managing apparatus 200 may efficiently divide processor resources in a many-core system when partitioning, such as firm partitioning, is enabled. Depending on the embodiment, firm partitioning may involve sharing hardware resources among multiple cores. Firm partitioning may be implemented at a socket or a sub-socket level. For socket level partitioning, each socket may belong to a particular partition. In the case of sub-socket partitioning, resources within the sockets, such as processing cores and Advanced Programmable Interrupt Controllers (APICs), may be shared among different partitions. Partition managing apparatus 200 may be used to allocate processing cores within the socket to different partitions.

Partition managing apparatus 200 may monitor the operation of a group of core partitions 250. In the embodiment depicted in FIG. 2, group of core partitions 250 has three partitions. Core 260 and core 262 are allocated to a first partition 252. Core 270 and core 272 are allocated to a second partition 254. A third partition 290 comprises core 280, core 282, core 284, and core 286. While the embodiment depicted in FIG. 2 has eight processing cores, other embodiments may have other numbers of processing cores, such as four or 16 processing cores. Additionally, while group of core partitions 250 has three partitions with different numbers of cores, other embodiments may have different numbers of partitions having different allocations of processing cores. For example, upon an analysis and core partition reallocation completed by partition managing apparatus 200, partition 254 may comprise core 280, core 282, core 270, and core 272, while partition 290 may comprise core 284 and core 286.

Partition managing apparatus 200 may need to analyze several factors to determine an acceptable or efficient allocation of cores for group of core partitions 250. First, partition managing apparatus 200 may need to evaluate performance of the cores in group of core partitions 250 as the cores execute instructions of programs and applications. In order to evaluate the performance of one or more cores in group of core partitions 250, partition managing apparatus 200 may utilize a performance module 220 to monitor the cores.

Performance module 220 may monitor and measure performance of the cores in numerous ways. Performance module 220 may monitor the execution of a program or an application being run in one partition. For example, performance module 220 may monitor the execution of a web browser application being executed by core 270 and core 272 in second partition 254. In another embodiment, performance module 220 may monitor the execution of a proprietary operating system being executed by core 270 and core 272 in second partition 252, such as Unix®, as well as applications that may be running within the operating system. In even further embodiments, performance module 220 may monitor the execution of a program or an application across two or more partitions. As an example of this scenario, performance module 220 may monitor the execution of two parallel execution threads for a video editing application running on cores 260 and 262 in first partition 252, as well as running on cores 280, 282, 284, and 286 in third partition 290. In other words, performance module 220 may monitor the throughput of tasks, such as programs, when those tasks are allocated to a single partition or among two or more partitions.

In addition to the different methods of monitoring the execution of applications, performance module 220 may also measure, or quantify, the performances of the cores in different ways. In some embodiments, performance module 220 may quantify performance as the number of instructions completed in a clock cycle multiplied by the operating frequency of the cores. That is to say, the performance measurement may be equal to the product of the core operating frequency and the instructions per clock cycle. In other embodiments, performance module 220 may quantify performance in other ways. For example, performance module 220 may tally the number of instructions completed in a set amount of time. Alternatively, performance module 220 may gauge performance by calculating a performance index or a benchmark using a variety of operational factors. Such measures of performance are given as examples. Different embodiments may employ numerous means to measure performance or throughput of the cores.

Second, partition managing apparatus 200 may need to monitor temperature of the cores or the chip containing the cores. In order to monitor and/or measure the temperature of the chip or die, partition managing apparatus 200 may utilize a temperature module 210. It may be beneficial or necessary to have partition managing apparatus 200 measure one or more chip temperatures, in addition to core throughput, due to a tradeoff between thermal and performance constraints. Since it may not always be feasible to know the application behavior before a system boot, the problem of core allocation may be complex since both thermal and throughput behavior may depend on the nature of the applications executing on the cores. By utilizing both performance module 220 and temperature module 210, partition managing apparatus 200 may evaluate data of both throughput and temperature to determine a core allocation that may optimize throughput while maintaining the core die temperature below a threshold.

Since the exact nature of the applications may not generally be known beforehand on all hardware platforms, a core allocation module 230 may reside within partition managing apparatus 200 and create an initial core allocation when the partition boots (or partitions boot) for a first time. For example, during an initial boot, core allocation module 230 may assign cores 260 and 262 for first partition 252, cores 270 and 272 to second partition 254, cores 280 and 282 to third partition 290, and cores 284 and 286 to a fourth partition.

Figure 4:
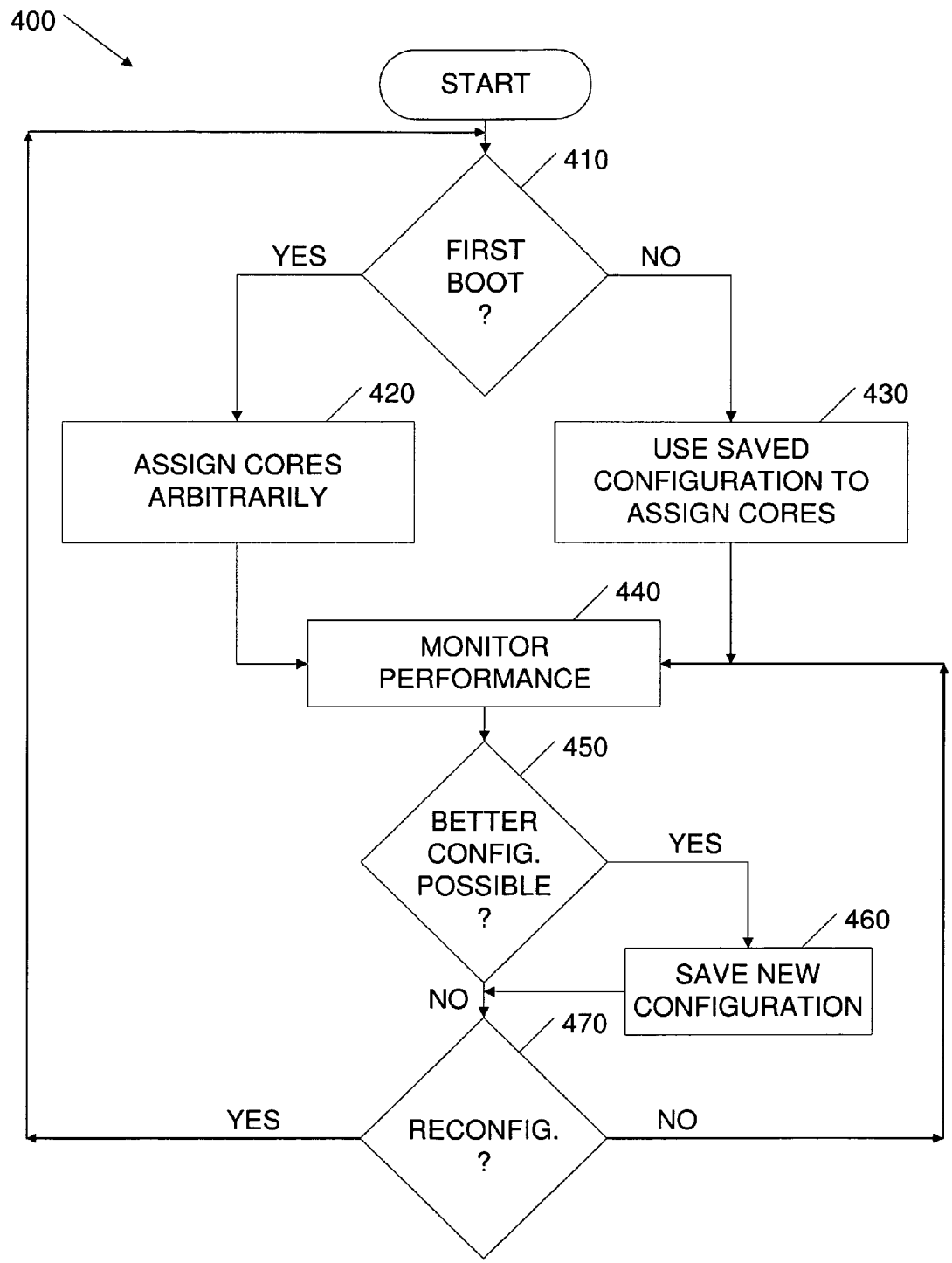
FIG. 4 depicts a flowchart for an algorithm that may monitor performance and reallocate cores to improve performance.

After each boot, core allocation module 230 may monitor the application behavior across partitions 252, 254, 290, and the fourth partition, and perform an analysis using the data from temperature module 210 and performance module 220 to determine a more optimal allocation of the cores in partition of cores 250, given the current load conditions. This allocation information, or configuration, may be used by core allocation module 230 to reallocate the cores. When a user or system administrator prompts an event that requires core reallocation between the partitions, such as a reboot or by some mechanism like fault isolation or core migration, core allocation module 230 may use the revised allocation to divide the cores among partitions. This process of evaluating core performance and temperature may be dynamic, with partition performance being monitored continuously. If a more optimal allocation is found over the then-current allocation, which may be caused by changed user habits or from changed applications, core allocation module 230 may verify that the performance gains obtained by completing the reallocation exceeds a threshold. If so, core allocation module 230 may reallocate the cores upon the occurrence of the next reallocation event. A detailed flowchart outlining an embodiment of this process is shown in FIG. 4, which will be discussed shortly.

Figure 3A:
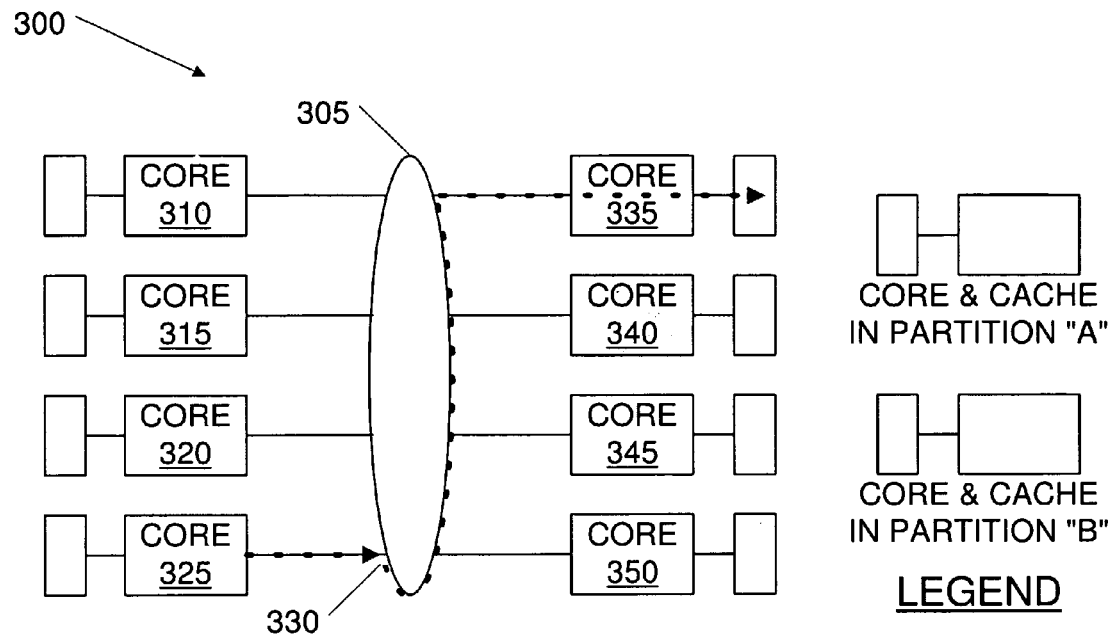
FIG. 3A illustrates numerous cores arranged in a ring interconnect topology assigned to different partitions.

To more clearly illustrate how core allocation may affect throughput, as well as how chip temperature may present a problem, we move now to FIG. 3A. FIG. 3A illustrates a set of cores 300 with numerous cores arranged in a ring interconnect topology and assigned to different firm partitions. Initially, such as during a first system boot, each firm partition may arbitrarily be assigned a specific number of cores. As illustrated in FIG. 3A, a partition management module may assign cores in a sequential manner with respect to the core identification numbers (IDs) within a socket. Set of cores 300 has cores 310, 320, 340, and 350 allocated in partition "B". Conversely, cores 315, 325, 335, and 345 are allocated in partition "A". Additionally, the caches for each of the cores are allocated in the respective partitions as well. The partition management module may assign cores to partitions in this alternating fashion during an initial boot, where the applications to be operated by a user are unknown.

Since the initial core assignment may not be able to take performance into consideration, there may be a possibility of resource underutilization at the socket level. As noted above, another important parameter that may be adversely affected with the topological nature of the core assignment is the power and heat distribution over the different areas of the socket containing the cores. Depending on the workloads or applications operating on the individual partitions, the power consumed and the heat generated may be heavily dependent on the topological distribution of the participating processor cores. Depending on the workloads, thermal hotspots can form on the most "busy" areas of the processor die. Such hotspots may necessitate slowing down of the processor or completely shutting it off. Such actions may lead to performance degradation.

One can now appreciate how the allocated core topology, or core arrangement, on a per-partition basis, may have a significant effect on partition performance. Given an on-die interconnect technology and the shared cache distribution, a workload running in a partition can not only generate undesirable interconnect traffic but can also lead to lot of WAIT cycles when the cores are waiting for data to be fetched from the caches. FIG. 3A illustrates a situation where two cores allocated to the same partition may nonetheless be topologically far, or distant, from the resources they use. In this case the resources of core 335 may be topologically distant from core 325. Again, worth emphasizing here is that the exact resources used may be heavily dependent on the application (workload) running on a partition, as well as which resources may be needed, may not be predicted a priori with 100% confidence beforehand.

Given the initial partition allocation of the cores shown in FIG. 3A, connected via ring interconnect 305, we may note that that the performance of a system containing these cores may suffer from two factors. Partition "A" may suffer performance degradation because of the extra wait times introduced when the cores are accessing data from other caches in the same partition. For example, partition "A" may experience extra wait times when core 325 accesses data from the cache for core 335 over interconnect path 330 since cores 325 and 335 are topologically distant. Additionally, partition "B" may also suffer performance degradation due to interconnect traffic for partition "A" over interconnect path 330. This performance degradation may result from interconnect path 330 consuming part of the otherwise available interconnect bandwidth of ring interconnect 305.

To combat this problem of performance degradation due to interconnect traffic, the partition management module may attempt to allocate cores, or hardware resources, to individual partitions in closely situated clusters. A cluster with individual resources (processing cores, memory, caches, etc.) topologically close together may be physically possible. Such a partitioning scheme may tend to reduce transaction times over ring interconnect 305 by localizing resource accesses within the clusters. However, two problems may result from carelessly implementing such a scheme.

First is the recurring problem of the initial boot sequence. Since the workload may determine resource requirements, it may not be possible for the partition management module to predict the exact resource addresses to be allocated to a partition at the boot time. The second problem involves thermal dissipation. As mentioned, high temperatures on the processor chip may necessitate slowing down or shutting down the processor. If the individual partition resources are clustered too closely, an application running in a partition may be able to create temperature hot-spots on the chip. Therefore, to avoid temperature hot-spots the partition management module may need to actually spread the partition entities over the chip. In other words, the solutions to the two different problems may be mutually exclusive, requiring the partition management module to strike a balance between two solutions. Stated yet another way, the partition management module may need to partition cores closer together to reduce transaction times between cores but not too close to avoid creating hot-spots.

The partition management module may therefore assign cores to partitions with relatively closely-spaced clusters, such that hot-spots are not likely to occur for most applications. The partition management module may monitor the performance of the cores in the partitions, monitor the thermal footprint of the chip via numerous temperature measurements of the die, and perform calculations to see if performance may be improved by altering the partitioning of the cores and/or hardware resources. If so, the partition management module may calculate a partition, or partitions, likely to produce an acceptable thermal footprint and save the partition allocation information so that it may be implemented on the next boot cycle or other reallocation event.

Figure 3B:
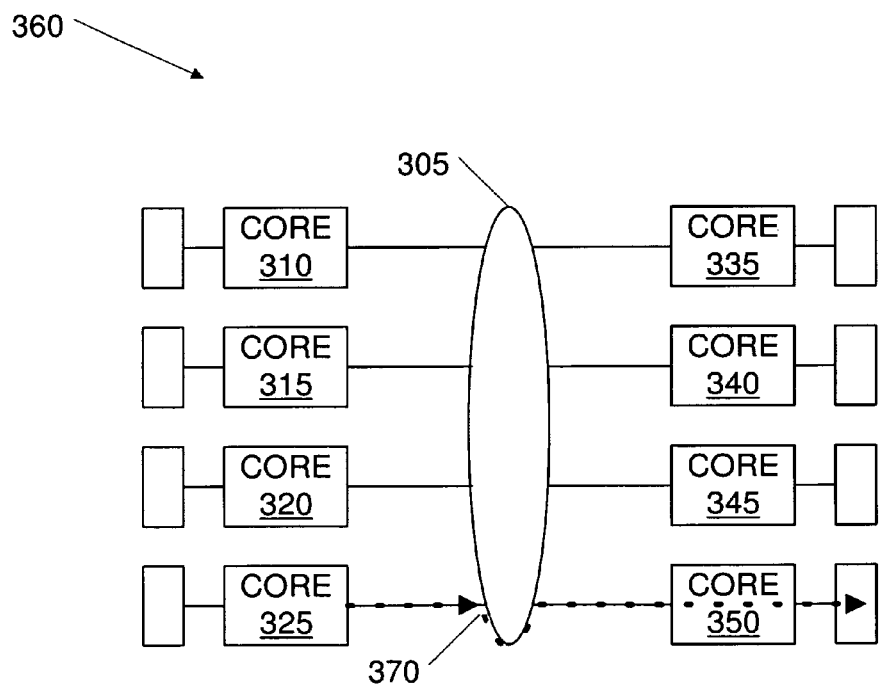
FIG. 3B illustrates how the numerous cores may be allocated to different partitions to improve performance.

FIG. 3B illustrates what may be a reallocated core partition arrangement 360. FIG. 3B may represent an acceptable partition reallocation calculated by the partition management module. For example, the partition management module may have noted that having core 325 located topologically distant from core 335 caused excessive transaction times. The partition management module may have initially tried to place core 320 into partition "A" and core 335 into partition "B". However, the partition management module may have been able to calculate or predict, based on the thermal data from a temperature module, that having the two cores located in such close proximity would lead to an unacceptably high temperature hot-spot. Accordingly, the partition management module may have instead elected to swap cores 335 and 350. In other words, core 335 was taken out of partition "A" and placed in partition "B", while core 350 was taken out of partition "B" and placed in partition "A". By doing so, core 325 may then be able to access the resources of core 350, which essentially "took the place" of core 335, with reduced transaction time and minimizing the impact to the available bandwidth for ring interconnect 305 since interconnect path 370 is appreciably shorter than interconnect path 330. Additionally, the interaction between core 325 and 350 may not create a hot-spot since they are located an acceptable distance apart.

One may note that the embodiments thus far have generally discussed allocating cores to partitions, without much discussion of allocating other hardware resources. In different embodiments, the hardware considered part of a core, or a group of cores may vary. For instance, a core in some embodiments may have only one arithmetic logic unit (ALU) while others have two or more ALUs. A core in some embodiments may have such hardware resources as instruction fetch and pre-decode units, instruction queues, schedulers, reorder buffers, and level-1 (L1) caches while other embodiments may not include such hardware resources. Additionally, cores in some embodiments may share level-2 (L2) caches while cores in other embodiments may not. Stated differently, the hardware resources for cores may vary in alternative embodiments and such resources may be allocated in a similar fashion to the cores discussed in the preceding example embodiments.

FIG. 4 depicts a flowchart 400 of an algorithm which may be used by a partition managing apparatus and/or a core allocation module to monitor the performance or throughput of cores in a partition and reallocate cores to improve performance. For example, an algorithm according to flowchart 400 may comprise the code or instructions carried out to partition cores of a processor similar to partition managing apparatus 200 shown in FIG. 2. Flowchart 400 begins with determining if the processor is being booted for the first time (element 410). For example, the computer system may be booted for a first time after its initial purchase or the system may be booting after any configuration of stored core allocation has been deleted or intentionally reset.

If the processor is being booted for a first time, the algorithm may instruct the partition managing apparatus to assign cores arbitrarily (element 420). Such an arbitrary core allocation may, for example, be arranged similar to the core allocation depicted in FIG. 3A or the core allocation shown in FIG. 2. If the processor is not being booted for a first time, which may correspond to a warm boot or upon the occurrence of a reallocation event, the algorithm of FIG. 4 may instruct the partition managing apparatus to use a saved configuration to assign cores (element 430). For example, the algorithm may have the partition managing apparatus to retrieve configuration information stored in nonvolatile memory, such as nonvolatile memory 120 shown in FIG. 1, or stored on a hard drive, such as SATA hard drive 145 also shown in FIG. 1.

After partitioning the cores using an arbitrary allocation (element 420) or using a saved configuration (element 430), the algorithm may instruct the partition managing apparatus to monitor the performance of the allocation of the cores (element 440). For example, the partition managing apparatus may have a core allocation module that periodically or continuously examines data or information provided by one or more performance modules. The performance modules may monitor core execution times, note core operating frequencies, and calculate throughput or performance of one or more cores in one or more partitions using such information. Based on the calculations provided by the performance modules, the core allocation module may make a determination of whether a reallocation of cores would help throughput (element 450). If so, the core allocation module and or the partition managing apparatus may store the improved core allocation information (element 460).

In addition to performance information being provided by the performance module, the core allocation module may also examine data or information provided by one or more temperature modules monitoring one or more temperatures of a chip, or one or more dies within the chip, containing the processor cores. The temperature module may periodically or continually measure chip temperatures by way of one or more temperature sensors embedded in or coupled to the processor chip. Based on the information provided by the performance and temperature modules, the core allocation module may make a determination of whether a reallocation of cores would help throughput (element 450), while striking a balance between partition core performance and acceptable operating temperature of the chip.

If the core allocation module determines that a reallocation would benefit performance, the algorithm may instruct the partition managing apparatus to restart the monitoring process (elements 470 and 410) so that the newly saved configuration (element 460) can be used to reallocate the cores (element 430). Alternatively, in case the core allocation module determines that a reallocation would not benefit performance, the algorithm may instruct the partition management module to go back and continue monitoring core allocation performance (element 440).

When operating according to flowchart 400, a partition managing apparatus may make no assumptions about the nature of the workloads to be executed on different computing platforms. Instead, the partition managing apparatus may measure performance dynamically and adjust the core allocation dynamically. When implemented in this manner, an embodiment may be used on a vast array of systems without needing to worry about exact usage scenarios. Additionally, the approach outlined by flowchart 400 may apply equally to a partitioned environment or to a single execution domain mode when scheduling processors.

Figure 5:
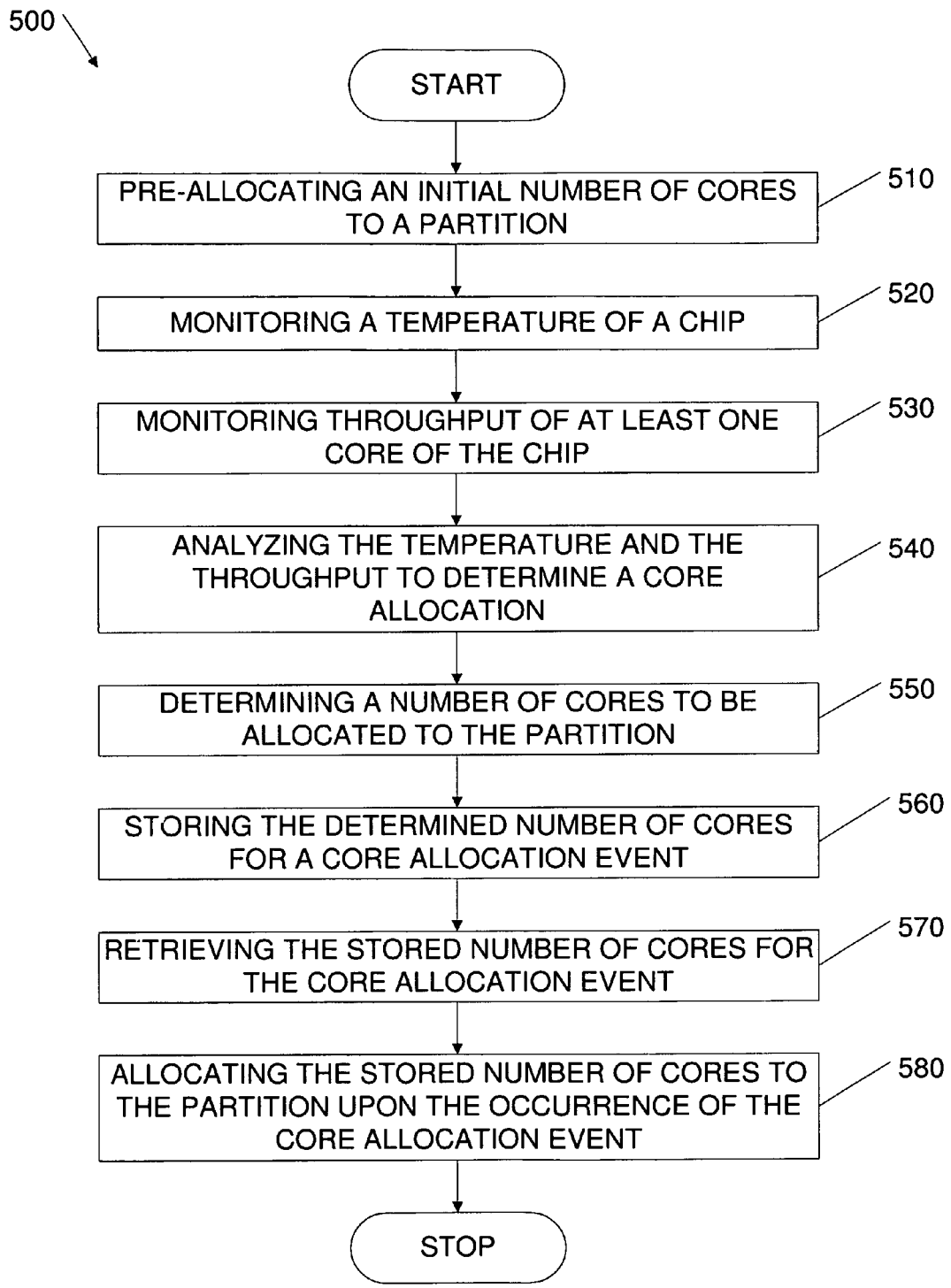
FIG. 5 illustrates a method for monitoring temperature of a chip, monitoring throughput of at least one core of the chip, and allocating cores to a partition based on an analysis of the temperature and the throughput.

FIG. 5 depicts a flowchart 500 illustrating an embodiment of a method for monitoring temperature of a chip, monitoring throughput of at least one core in the chip, and allocating cores to a partition based on an analysis of the temperature and the throughput. Flowchart 500 begins with pre-allocating an initial number of cores to a partition (element 510). For example, a core allocation module may divide eight processing cores into two partitions having four cores each, similar to the core allocation shown in FIG. 3A. Upon pre-allocating the cores (element 510), an embodiment according to flowchart 500 may continue by monitoring a temperature of a chip (element 520). For example, an integrated circuit temperature sensor may be embedded in a die of the chip, whereupon a temperature module may periodically poll the temperature sensor every five seconds and store the successive temperature measurements in a temperature table or temperature log in memory.

While temperature of the chip is being monitored (element 520), the method embodiment of flowchart 500 may also monitor the throughput of at least one core of the chip (element 530). In some embodiments, a performance module may only monitor the throughput of one core. In other embodiments, multiple cores in multiple partitions may be monitored so that any partition performance may be improved if permissible. Once the temperature and performance modules start collecting thermal and performance-related information, the method embodiment of flowchart 500 may continue by analyzing the temperature and the throughput to determine a core allocation (element 540). Once the performance-related information has been analyzed (element 540), a core allocation module may determine whether performance may be improved by allocating a different number of cores to a partition (element 550) and storing the different number of cores in anticipation of a core allocation event (element 560). Such information for the altered allocation may be stored in nonvolatile memory, such as nonvolatile memory 120 in FIG. 1, or stored in another form of nonvolatile memory, such as a flash memory drive coupled to USB device 180 also shown in FIG. 1.

After storing the information for the altered core allocation, the method embodiment according to flowchart 500 may retrieve the altered core allocation information upon the occurrence of an allocation event (element 570). Upon retrieving the allocation information (element 570), the core allocation module may allocate cores to partitions according to the stored allocation information upon the occurrence of the core allocation event (element 580). Such a core allocation event may be a fault condition of the processor necessitating a reboot, or a warm boot initiated by a user. As described with the other embodiments, different events may trigger the reallocation of processing cores.

Another embodiment of the invention is implemented as a program product for use with a partition managing apparatus to reallocate processing cores and hardware resources to partitions in order to improve processor throughput, such as processor 160 for system 100 as illustrated in FIG. 1. The program(s) of the program product defines functions of the embodiments (including the methods described herein) and can be contained on a variety of data and/or signal-bearing media. Illustrative data and/or signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed to a computer by a communications medium, such as through a computer or telephone network, including wireless communications. The latter embodiment specifically includes information downloaded from the Internet and other networks. Such data and/or signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by a computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

It will be apparent to those skilled in the art having the benefit of this disclosure that the present invention contemplates apparatuses, systems, methods, and media to allocate cores or core resources to partitions of computing apparatuses. It is understood that the form of the invention shown and described in the detailed description and the drawings are to be taken merely as examples. It is intended that the following claims be interpreted broadly to embrace all the variations of the embodiments disclosed.

Although the present invention and some of its aspects have been described in detail for some embodiments, it should be understood that various changes, substitutions and alterations can be made herein without departing from the spirit and scope of the invention as defined by the appended claims. Although an embodiment of the invention may achieve multiple objectives, not every embodiment falling within the scope of the attached claims will achieve every objective. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An apparatus to manage a partition of cores comprising:
   an integrated circuit chip comprising at least two cores;
   a performance module to monitor throughput of a core of the at least two cores;
   a temperature module to monitor a temperature of the integrated circuit chip; and
   a core allocation module to pre-allocate at least one core of the at least two cores to the partition, wherein the core allocation module is configured to determine a number of cores to be allocated to the partition in response to analysis of data of the performance module and in response to analysis of data of the temperature module, and wherein the core allocation module is configured to store and retrieve the determined number of cores, and wherein the core allocation module is configured to allocate the stored number of cores to the partition to increase the throughput, and wherein the partition is designated to a particular task.

2. The apparatus of claim 1, wherein the temperature module is configured to monitor a plurality of temperatures of the integrated circuit chip.

3. The apparatus of claim 1, wherein the particular task is execution of an operating system program.

4. The apparatus of claim 1, wherein the performance module monitors execution of a program in a second partition.

5. The apparatus of claim 1, wherein the performance module monitors execution of a program across the partition and a second partition.

6. The apparatus of claim 1, wherein the core allocation module pre-allocates the at least one core during an initial boot of the partition.

7. The apparatus of claim 1, wherein the core allocation module allocates the determined number of cores in response to a reallocation event.

8. The apparatus of claim 7, wherein the reallocation event comprises a reboot.

9. A system, comprising:
   an integrated circuit chip comprising at least two cores;
   a performance module to quantify a performance measurement of a number of cores in a partition, wherein the partition is designated to a particular task;
   a temperature sensor to measure a temperature of the integrated circuit chip;
   a core allocation module to pre-allocate at least one core of the at least two cores to the partition, wherein the core allocation module is configured to determine a number of cores to be allocated to the partition in response to an analysis of the performance measurement and in response to an analysis of the temperature measurement, and wherein the core allocation module is configured to store and retrieve the determined number of cores, and wherein the core allocation module is configured to allocate the the stored number of cores to the partition to increase the quantity of the performance measurement; and
   a dynamic random access memory (DRAM) module coupled to the at least one core.

10. The system of claim 9, wherein the temperature sensor is configured to measure a plurality of temperatures of the integrated circuit chip.

11. The system of claim 10, wherein the core allocation module allocates stored number of cores to the partition in response to analysis of the plurality of temperatures.

12. The system of claim 9, further comprising a task allocation module to allocate tasks to the at least one core.

13. The system of claim 12, wherein the task allocation module allocates tasks to the stored number of cores upon a fault event.

14. The system of claim 12, wherein the task allocation module allocates tasks to the stored number of cores to balance partition loading.

15. The system of claim 9, wherein the core allocation module allocates the stored number of cores based upon a reallocation event.

16. The system of claim 15, wherein the stored number of cores is stored in the DRAM module to be accessed for the reallocation event.

17. A method of partitioning cores, the method comprising:
   pre-allocating an initial number of cores to a partition;
   monitoring throughput of at least one core in an integrated circuit chip;
   monitoring a temperature of the chip;
   determining a number of cores to be allocated to the partition in response to an analysis of the temperature and the throughput, wherein the determined number is different that the initial number, and wherein the partition is designated to a particular task;

storing the determined number of cores for an event of allocation;

retrieving the stored number of cores for the event of allocation; and allocating the stored number of cores to the partition for the event of allocation to increase the throughput in response to the temperature.

18. The method of claim 17, further comprising monitoring a plurality of temperatures of the chip.

19. The method of claim 17, wherein the pre-allocating occurs based upon a boot event.

20. The method of claim 17, wherein the storing the determined number of cores for retrieval for the event of allocation.

21. The method of claim 17, determining a topology for the determined number of cores.

22. A machine-accessible non-transitory storage medium with stored instructions, which when executed by an apparatus, cause the apparatus to perform operations, the operations comprising:

pre-allocating an initial number of cores to a partition;

monitoring throughput of at least one core in an integrated circuit chip;

monitoring a temperature of the chip;

determining a number of cores to be allocated to the partition in response to analysis of the throughput and analysis of the temperature, wherein the determined number is different that the initial number, and wherein the partition is designated to a particular task;

storing the determined number of cores for an event of allocation;

retrieving the determined number of cores for the event of allocation; and allocating the stored number of cores to the partition for the event of allocation to increase the throughput in response to the temperature.

23. The machine-accessible non-transitory storage medium of claim 22, further comprising monitoring a plurality of temperatures of the chip.

24. The machine-accessible non-transitory storage medium of claim 23, further comprising wherein the determining the number of cores is based upon the plurality of temperatures.

25. The machine-accessible non-transitory storage medium of claim 22, further comprising assigning tasks to the at least one core and other cores to balance task loads.

26. The machine-accessible non-transitory storage medium of claim 22, further comprising determining a topology for the determined number of cores.

* * * * *